United States Patent [19]

Cooper et al.

[11] 4,315,482

[45] Feb. 16, 1982

[54] THREE-DIMENSIONAL PHONETIC ALPHABET

[76] Inventors: Stephen R. Cooper, 246 Sunrise Hill Ct., Norwalk, Conn. 06851; Charles H. Cooper, 144-60 25th Dr., Flushing, N.Y. 11354

[21] Appl. No.: 152,518

[22] Filed: May 22, 1980

Related U.S. Application Data

[62] Division of Ser. No. 955,621, Oct. 30, 1978, Pat. No. 4,245,587.

[51] Int. Cl.³ ............................................. A01K 15/02
[52] U.S. Cl. ..................................................... 119/29
[58] Field of Search ................ 119/29; 434/170, 171, 434/172, 178

[56] References Cited

U.S. PATENT DOCUMENTS 3,235,976 2/1966 Elliott et al. ........................ 434/170

FOREIGN PATENT DOCUMENTS

1521793 3/1968 France ................................ 434/170

*Primary Examiner*—Hugh R. Chamblee
*Attorney, Agent, or Firm*—Gottlieb, Rackman & Reisman

[57] ABSTRACT

A phonetic alphabet for communicating with dolphins, porpoises and whales inlcudes three basic geometric shapes, various combinations of which are used to represent speech sounds. The alphabet consists of eighteen symbols which may be understood by animals trained to identify these symbols with words by using their innate echolocation sensory capabilities, and may also be understood visually by human trainers.

31 Claims, 37 Drawing Figures

THREE-DIMENSIONAL PHONETIC ALPHABET

This is a division of our co-pending application Ser. No. 955,621, filed Oct. 30, 1978, now U.S. Pat. No. 4,245,587.

This invention pertains to the field of phonetics, and, more particularly, to a phonetic system for communicating with marine mammals such as dolphins, porpoises and whales.

In the past, various attempts have been made to communicate with marine mammals such as dolphins. Although these animals apparently have no language of their own, efforts have been made to decipher the sounds made by these creatures, and to duplicate these sounds electronically. In addition, computer-produced tones have been used to represent words in at least one research project involving dolphins. Although the research in this area has been extensive, these efforts have had limited success.

On the other hand, attempts have been made to teach dolphins a human language, such as English. However, for physiological reasons, it is very difficult for these creatures to learn to speak human languages, and therefore these efforts have also met with only limited success.

It is well known that dolphins, porpoises and whales are relatively intelligent creatures, having a large brain size in comparison with other animals. Moreover, these animals have heightened sensory abilities, which they utilize to navigate under water by emitting sounds and then detecting the "echoes" after they are reflected from other objects. Using this echolocation system, these animals can discriminate among objects having different shapes, sizes and densities. See, generally, *The New Encyclopedia Britannica*, 15th Edition, Macropaedia, vol. 19, page 807. Moreover, it is also known that these creatures are capable of distinguishing visually among different colors.

Although the intelligence of these creatures has prompted the various above-mentioned attempts made by others to communicate with them, the prior art has failed to develop means for communicating with dolphins, porpoises and whales which fully utilizes the inherent sensory capabilities of these creatures, and which, at the same time, is completely understandable by human trainers from different countries.

It is therefore the principal object of this invention to provide a system for communicating with dolphins, porpoises and whales which may be understood aurally by these animals and visually by human beings.

Another object of this invention is to provide a system for communicating with dolphins, porpoises and whales which is easy to use and relatively inexpensive to construct.

Briefly, in accordance with the principles of this invention, a three-dimensional phonetic alphabet for communicating with dolphins, porpoises and whales consists of three basic shapes among which these animals are able to discriminate. Specifically, both rectangular solids and cylindrical solids are used, the rectangular solids being provided with either flat or concave faces. Each basic shape is used in three different sizes, and various combinations of shapes are used to form an alphabet of eighteen symbols, each of which represents one or more speech sounds, such as vowels or consonants. One or more of the symbols may be arranged into words, which these animals can "read" aurally using their unique echolocation system.

It is therefore a feature of an embodiment of this invention that a system for communicating with dolphins, porpoises and whales utilizes objects which human beings can see, and which these animals can hear, thereby establishing a common ground for communication with these creatures.

Another feature of an embodiment of this invention is that a system for communicating with dolphins, porpoises and whales is based upon phonetic sounds rather than on the alphabet of a particular language, thereby permitting communication with such animals regardless of the human language which is spoken by the trainers.

Still another feature of an embodiment of this invention is that a system for communicating with dolphins, porpoises and whales comprises a phonetic alphabet composed of only eighteen symbols, each of which has a unique echolocation "image" when viewed by these creatures.

Further objects, features and advantages of this invention will become more readily apparent from an examination of the following specification when taken in conjunction with the accompanying drawings, wherein:

Figure 1:
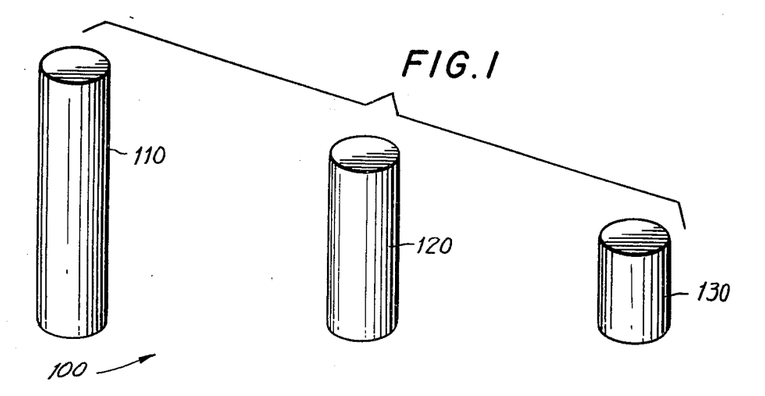
FIG. 1 is a perspective view of the cylindrical solid which comprises one of the basic shapes utilized in a preferred embodiment of this invention, illustrating three different sizes thereof.
Figure 4:
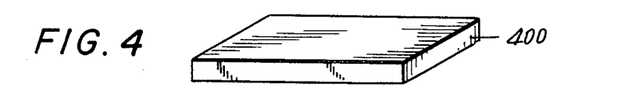
FIG. 4 is a perspective view of a base for use with the present invention.
Figure 5:
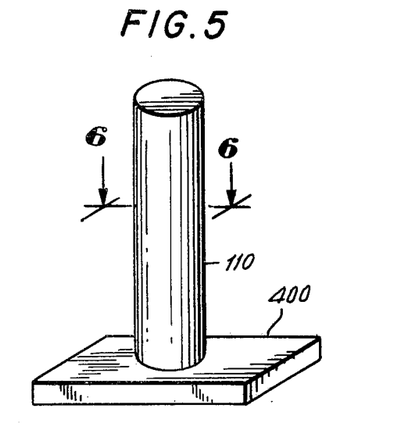
FIG. 5 shows one of the cylindrical solids of FIG. 1 mounted on a base.
Figure 6:
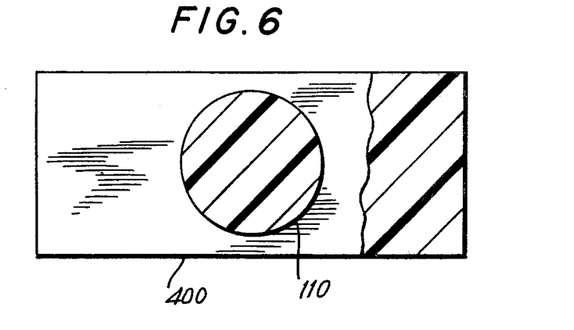
FIG. 6 is an enlarged cross-sectional view taken along the lines 6—6 of FIG. 5 in the direction of the arrows.

Referring now to the drawings, and specifically to FIGS. 1-10, a cylindrical solid, a rectangular solid with concave faces, and a rectangular solid with flat faces, which together comprise the three basic "building blocks" of the preferred embodiment of the present invention, are generally designated 100, 200 and 300, respectively. As shown in FIGS. 1 and 6, cylindrical solid 100 is formed in accordance with a geometric shape known as a right circular cylinder and has a circular cross-section. Cylindrical solid 100 is constructed in three different sizes, having height ratios of 3:2:1. Thus, as shown in FIG. 1, a cylindrical solid 110 of maximum height, a cylindrical solid 120 of intermediate height, and a cylindrical solid 130 of minimum height are provided.

Figure 2:
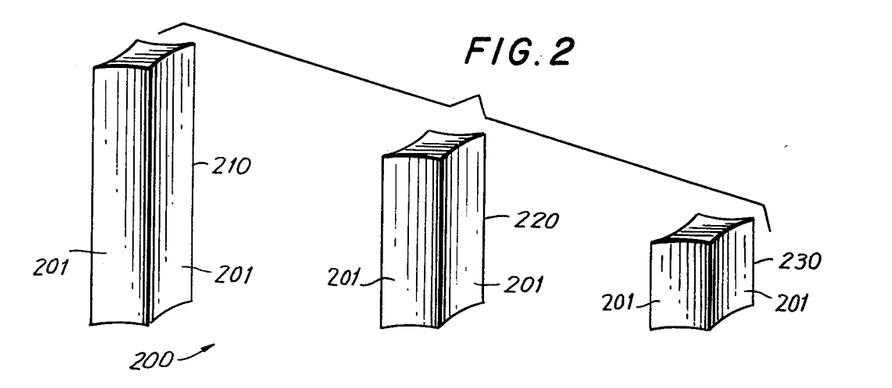
FIG. 2 is a perspective view of the rectangular solid with concave faces which comprises another of the basic shapes utilized in a preferred embodiment of this invention, illustrating three different sizes thereof.
Figure 8:
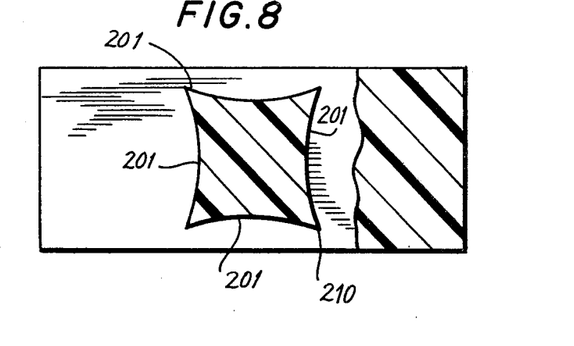
FIG. 8 is an enlarged cross-sectional view taken along the lines 8—8 of FIG. 7 in the direction of the arrows.

The rectangular solid 200 of FIG. 2 has four indented or concave faces 201, as shown most clearly in FIG. 8. The radius of curvature of concave faces 201 is not critical, but is preferably chosen so that each indentation is one-half as deep as it is wide in order to best reflect the sound waves emitted by dolphins, porpoises and whales, although shallower indentations, such as those shown in FIG. 8, may be used. A rectangular solid 210 of maximum height having concave faces, a rectangular solid 220 of intermediate height having concave faces, and a rectangular solid 230 of minimum height having concave faces, with height ratios of 3:2:1, respectively, are illustrated in FIG. 2.

Figure 3:
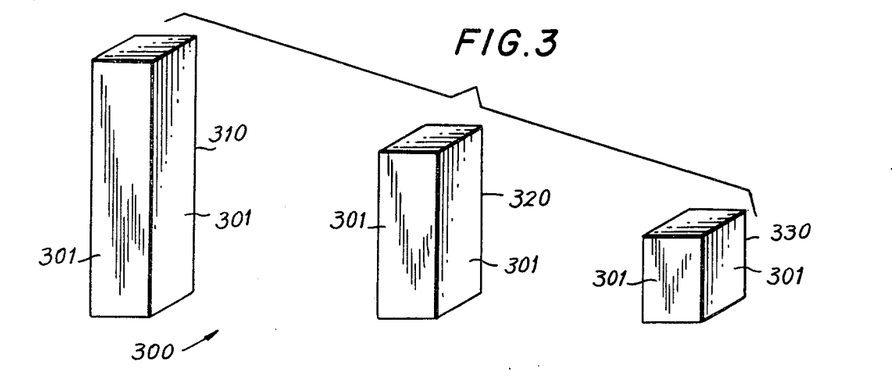
FIG. 3 is a perspective view of the rectangular solid with flat faces which comprises the third basic shape utilized in a preferred embodiment of this invention, illustrating three different sizes thereof.
Figure 10:
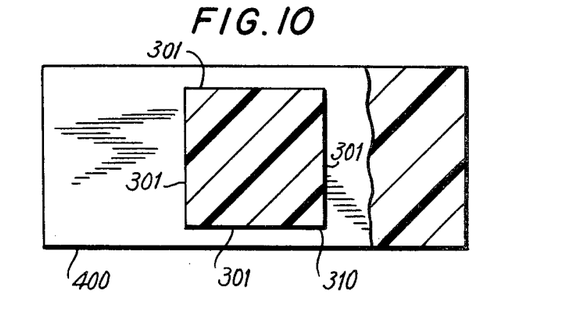
FIG. 10 is an enlarged cross-sectional view taken along the lines 10—10 of FIG. 9 in the direction of the arrows.

As shown in FIGS. 3 and 10, rectangular solid 300 has flat faces 301, and is generally square in cross-section. A rectangular solid 310 of maximum height, a rectangular solid 320 of intermediate height, and a rectangular solid 330 of minimum height, all of which have flat faces, are also provided, again with height ratios of 3:2:1.

In the preferred embodiment of this invention, each of the eighteen symbols is mounted on a generally rectangular base 400, shown in FIG. 4. Preferably, each symbol is centered upon the base 400, to which it may be affixed in any conventional manner, for example, by means of a strong adhesive. Alternatively, each symbol may be formed integrally with such a base.

Figure 7:
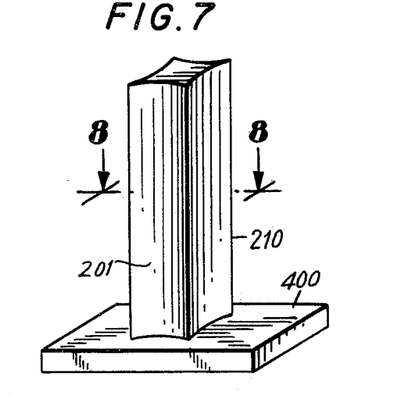
FIG. 7 shows one of the rectangular solids of FIG. 2 mounted on a base.
Figure 9:
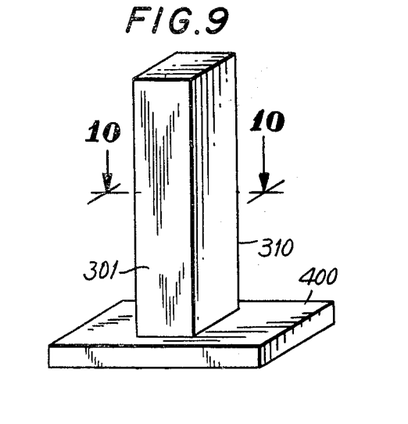
FIG. 9 shows one of the rectangular solids of FIG. 3 mounted on a base.

For example, a cylindrical solid 110 of maximum height is shown centered on a base 400 in FIG. 5. Similarly, FIG. 7 illustrates a rectangular solid 210 of maximum height, having concave faces, centered on a base 400, while FIG. 9 shows a rectangular solid 310 of maximum height, having flat faces, centered on a base 400.

It will be understood, however, that this alphabet includes symbols consisting of two solids, as well as symbols consisting of only one solid, as set forth hereinafter. Moreover, it is also contemplated that symbols consisting of more than two solids may be used in other alternative embodiments of this invention. Accordingly, for symbols consisting of two or more solids, the axis of each such symbol may be centered upon the base 400, as illustrated in FIGS. 14-16 and 20-28.

In the preferred embodiment of the present invention, solids 100, 200 and 300, and base 400, may be constructed of plastic, as shown in FIGS. 5-10. However, as discussed more fully hereinbelow, solids 100, 200 and 300 may also be composed of other materials, such as stainless steel, nickel, aluminum, brass, rubber, wood or glass.

As set forth above, each of solids 100, 200 and 300 is constructed in three different sizes, having height ratios of 3:2:1. Thus, as shown in FIGS. 1-3, solids of maximum height, intermediate height and minimum height are contemplated for each shape, resulting in a total of nine different shapes which may be combined, as more fully described hereinafter, to form the eighteen symbols of the three-dimensional alphabet of the present invention.

Each of the eighteen symbols has a phonetic value, consisting of one or more related speech sounds. Six of the symbols represent vowel sounds, while the remaining twelve symbols are assigned consonantal sounds. In FIGS. 11-28, the phonetic value is shown adjacent to each of the eighteen symbols of this alphabet, and examples of words in which these speech sounds are used are set forth hereinbelow in Tables I-XVIII. In the interest of uniformity, the International Phonetic Association alphabet is used throughout.

Phonetics, the science of speech sound, is germane to the present invention, and a detailed exposition of its basic principles may be obtained from reference works such as the following: Bloomfield, Leonard, *Language,* New York: Holt, Rinehart and Winston, 1933; Kurath, Hans and Raven I. McDavid, Jr., *The Pronunciation of English in the Atlantic States,* Ann Arbor: University of Michigan Press, 1961; and Kenyon and Knott, *Pronouncing Dictionary of American English,* Springfield: G. and C. Merriam Co., 1944. The teachings of these works are incorporated by reference herein. As will be evident to those skilled in this art, the use of phonetic values establishes a common ground among the world's many languages, and the alphabet of the present invention may therefore be used by oceanographers, linguists and scientists of all countries.

In each of Tables I-XVIII below, five columns of information are presented for each of the eighteen symbols of this alphabet. In the first column, the speech sounds which comprise the phonetic value of the associated symbol are listed.

The second column offers an example of a language in which each speech sound may be found. In many cases, one such example suffices. In other cases, several sample languages are shown, in order to emphasize that there are varied uses for the same sound, and also that the spelling of a word often has little to do with its pronunciation. When only one source language is given in the second column, this does not imply that this is the only language in which the associated sound is used. However, that is sometimes the case. Where English is used, the reference is to American English, unless otherwise indicated.

In the third column, an example of at least one word in which the sound is used is given. Additionally, there appears a translation and transliteration, if necessary. Where possible, and for the sake of clarity in this application, the English language is the source for most of the examples.

The fourth column lists the phonetic transcription of the sample word in the third column. Of course, pronunciations vary within a language, e.g., from dialect to dialect, from area to area, even (at times) from speaker to speaker. Accordingly, the phonetic transcription for each word given in the fourth column corresponds to an "average" standard pronunciation.

In the fifth column, a description is given of the sound listed in the first column. There are numerous parameters by which speech sounds may be classified. As will be apparent to those skilled in phonetics, the descriptions given here are concerned with the articulatory processes which govern the formation of these sounds.

The six symbols of this alphabet which represent vowel sounds are shown in FIGS. 11–16, each mounted on a base 400. Each symbol and the phonetic value associated therewith will now be described in detail.

Figure 11:
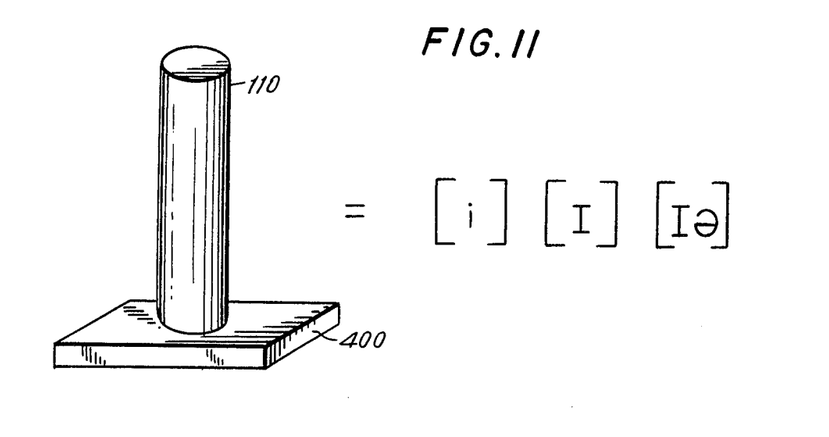
FIGS. 11-28 are perspective views of the eighteen symbols of the preferred embodiment of the present invention, together with a representation of the phonetic value of each symbol.

The symbol shown in FIG. 11 consists of a cylindrical solid 110 of maximum height. The phonetic value of this symbol consists of three separable speech sounds, examples of which are given in Table I.

TABLE I

| Speech Sound | Language | Examples | Phonetic Transcription | Description |
|---|---|---|---|---|
| [ i ] | French | dix (ten) | dis | Unrounded, high, front vowel |
|  | English | deem | dim | Unrounded, high, front vowel, but less tense than above |
| [ ɪ ] | English | lick | lɪk | Unrounded, high, front vowel; much less tense than above, also, lower than above |
| [ ɪə ] | Enlgish | mere | mɪər | Diphthong |

Figure 12:
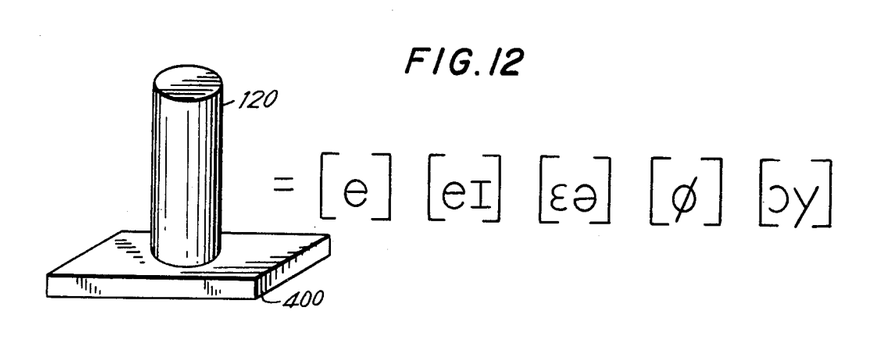

The symbol shown in FIG. 12 comprises a cylindrical solid 120 of intermediate height. There are five speech sound associated with this symbol, as given in Table II.

TABLE II

| Speech Sound | Language | Examples | Phonetic Transcription | Description |
|---|---|---|---|---|
| [ e ] | French | parler (to speak) | parle | Unrounded, mid, front vowel |
| [ eɪ ] | English | main | meɪn | Diphthong |
| [ ɛə ] | English | mail | mɛəl | Diphthong |
| [ ø ] | French | bleu (blue) | blø | Rounded, mid, front vowel |
| [ ɔy ] | German | heute (today) | hɔytə | Diphthong |

Figure 13:
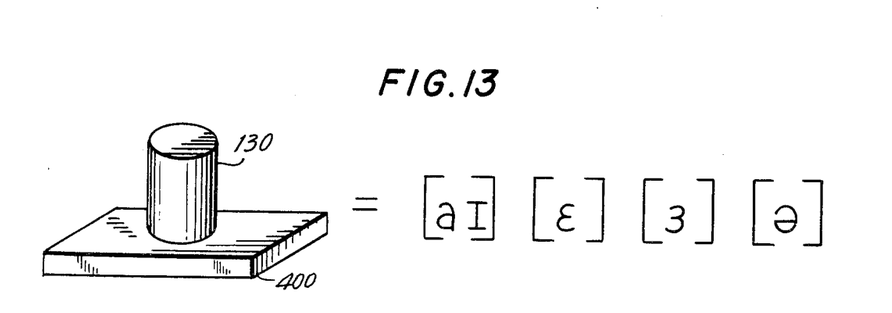

The symbol shown in FIG. 13 consists of a single cylindrical solid 130 of minimum height. There are four speech sounds associated with this symbol, examples of which are given in Table III.

TABLE III

| Speech Sound | Language | Examples | Phonetic Transcription | Description |
|---|---|---|---|---|
| [ aɪ ] | English | mile | maɪl | Diphthong |
| [ ɛ ] | English | den | dɛn | Unrounded, mid, front vowel (more lax than [ e ]) |
| [ ɜ ] | English | turn | tɜrn | Unrounded, mid, central vowel (almost always precedes some form of [ r ] coloring) |
| [ ə ] | English | above | əbʌv | Schwa: mid, central vowel (always unstressed) |

Figure 14:
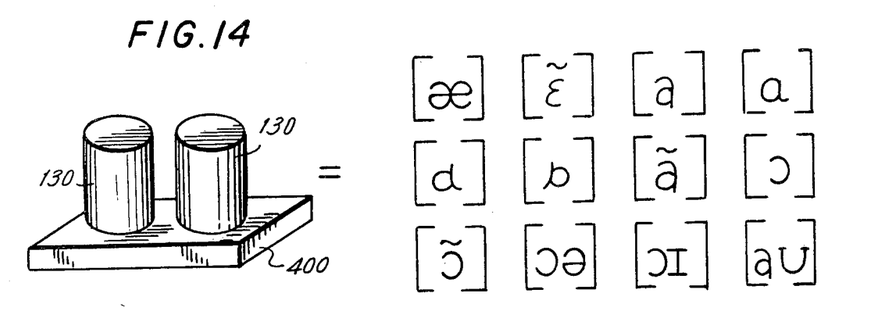

The symbol shown in FIG. 14 consists of two cylindrical solids 130 of minimum height. The phonetic value of this symbol consists of twelve speech sounds, as shown in Table IV. It should be noted that the third, fourth, fifth and sixth speech sounds assigned to this symbol are subject to many, many dialectal English variations, and, therefore, should be taken quite generally.

TABLE IV

| Speech Sound | Language | Examples | Phonetic Transcription | Description |
|---|---|---|---|---|
| [ æ ] | English | back | bæk | Low, front vowel (not a diphthong) |
| [ ɛ̃ ] | French | vin (wine) | vɛ̃ | Mid, front nasalized vowel |
| [ a ] | French | mal (sickness, evil, harm) | mal | Low, front to central, unrounded vowel |
| [ ɑ ] | English | father | faðər | Unrounded, low, back vowel |
| [ ɑ ] | English | knot | nɑt | Low, back vowel |
| [ ɒ ] | English British / English | coffee hot  or | kɒfi / kɔfi hɒt | Low, back, slightly rounded version of [ ɑ ] |
| [ ã ] | French | temps (time, season) | tã | Unrounded, low, back, nasalized vowel |
| [ ɔ ] | English | walk | wɔk | Rounded, mid, back vowel |
| [ õ ] | French | mont (mountain) | mõ | Low to mid, back, nasalized vowel |
| [ ɔə ] | English | bore | bɔər | Diphthong |
| [ ɔɪ ] | English | toy | tɔɪ | Diphthong |
| [ aʊ ] | English | round | raʊnd | Diphthong |

Figure 15:
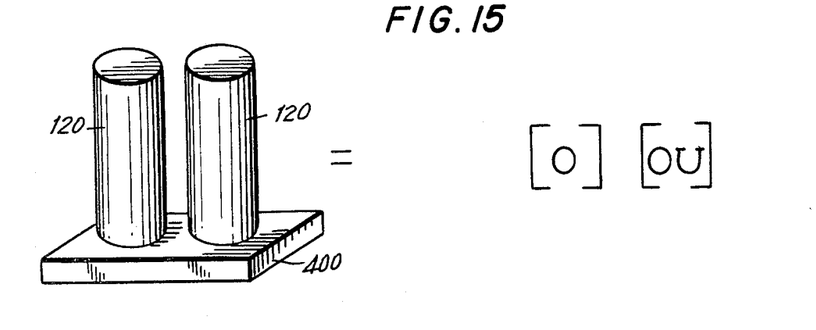

The symbol shown in FIG. 15 comprises two cylindrical solids 120 of intermediate height. There are two speech sounds associated with this symbol, examples of which are given in Table V.

TABLE V

| Speech Sound | Language | Examples | Phonetic Transcription | Description |
|---|---|---|---|---|
| [ o ] | French | aux (to, in, with: plural form) | o | Rounded, mid, back vowel |
|  | English | notation | noteɪʃən | Rounded, mid, |

TABLE V-continued

| Speech Sound | Language | Examples | Phonetic Transcription | Description |
|---|---|---|---|---|
| | | | | back vowel, but less tense than above |
| [oʊ] | English | most | moʊst | Diphthong |

Figure 16:
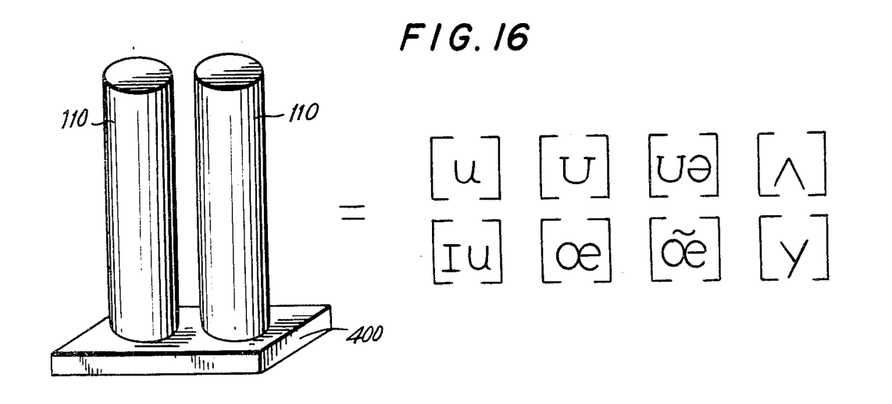

The symbol shown in FIG. 16 consists of two cylindrical solids 110 of maximum height, with which eight speech sounds are associated, as shown in Table VI.

TABLE VI

| Speech Sound | Language | Examples | Phonetic Transcription | Description |
|---|---|---|---|---|
| [u] | English | loose | lus | Rounded, high, back vowel |
| | French | goût (taste, flavor, style) | gu | Slightly higher than above (more tense) |
| [ʊ] | English | look | lʊk | Rounded, high, back vowel |
| | German | Mutter (mother) | mʊtər | (more lax than [u]) |
| [ʊə] | English | lure | lʊər | Diphthong |
| [ʌ] | English | luck | lʌk | Mid, central vowel |
| [ɪu] | English | Tuesday | tɪuzdeɪ | Diphthong |
| [œ] | French | seul (only, single) | sœl | Rounded, mid, front vowel |
| [œ̃] | French | un (one) | œ̃ | Rounded, mid, front, nasalized vowel |
| [y] | French | lu (have read) | ly | Rounded, high, front vowel |
| | | rue (street) | ɣy | |

The twelve symbols of this alphabet which represent consonantal sounds are shown in FIGS. 17–28, and each symbol is mounted on a base 400.

Figure 17:
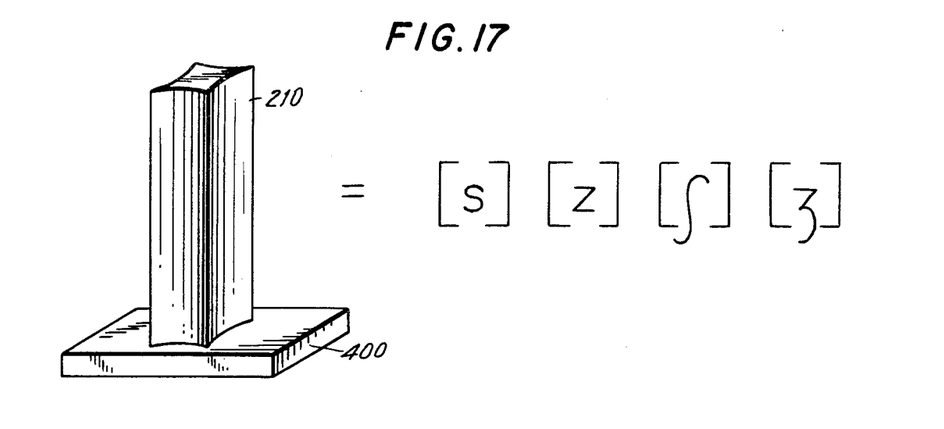

FIG. 17 shows a symbol consisting of a rectangular solid 210 of maximum height having concave faces. There are four speech sounds associated with this symbol, as shown in Table VII.

TABLE VII

| Speech Sound | Language | Examples | Phonetic Transcription | Description |
|---|---|---|---|---|
| [s] | English | sun | sʌn | Voiceless, apico-alveolar fricative |
| [z] | English | zinc | zɪŋk | Voiced, apico-alveolar fricative |
| [ʃ] | English | shell | ʃɛl | Voiceless, apico-prepalatal fricative |
| [ʒ] | English | leisure | liʒər | Voiced, apico-prepalatal fricative |
| | French | jardin (garden) | ʒærdɛ̃ | |

Figure 18:
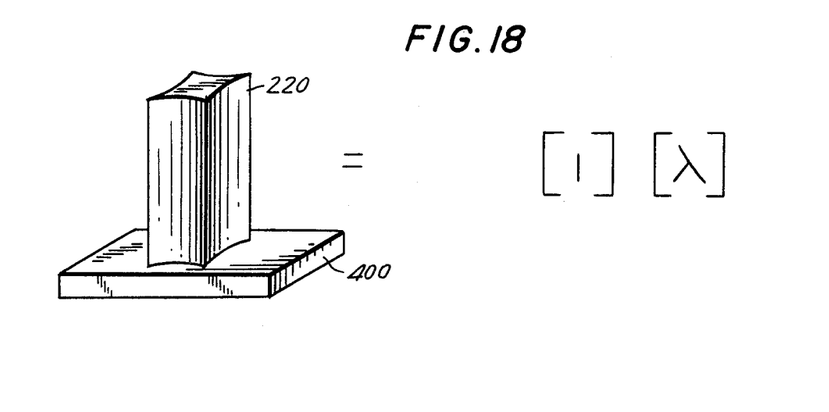

The symbol shown in FIG. 18 comprises a rectangular solid 220 of intermediate height having concave faces, to which two speech sounds have been assigned. Examples of these sound may be found in Table VIII.

TABLE VIII

| Speech Sound | Language | Examples | Phonetic Transcription | Description |
|---|---|---|---|---|
| [l] | English | luck | lʌk | Voiced, apico-laminal lateral |

TABLE VIII-continued

| Speech Sound | Language | Examples | Phonetic Transcription | Description |
|---|---|---|---|---|
| [λ] | Spanish | estrella (star) | ɛstreλa | Voiced, frontal lateral |
| | Italian | figlio (son) | fiλo | |

Figure 19:
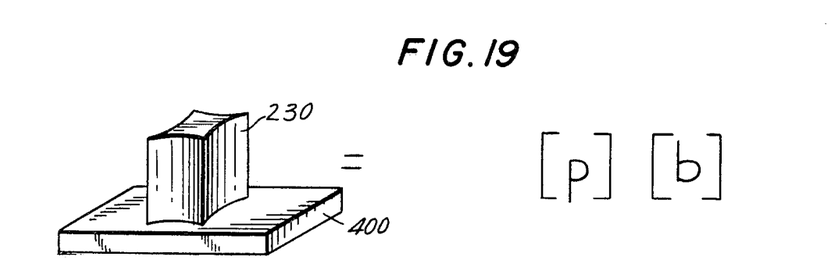

The symbol shown in FIG. 19 consists of a rectangular solid 230 of minimum height having concave faces. Examples of the two speech sounds associated with this symbol are given in Table IX.

TABLE IX

| Speech Sound | Language | Examples | Phonetic Transcription | Description |
|---|---|---|---|---|
| [p] | English | pet | pɛt | Voiceless, bilabial stop |
| [b] | English | boy | bɔɪ | Voiced, bilabial stop |

Figure 20:
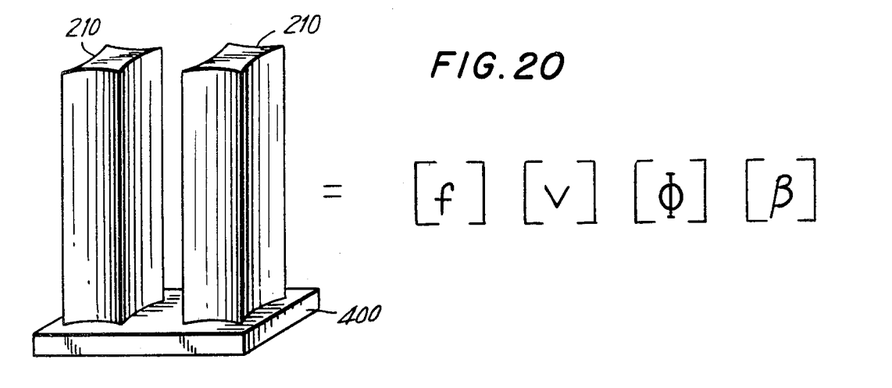

FIG. 20 shows a symbol which comprises two rectangular solids 210 of maximum height having concave faces. The phonetic value of this symbol includes four speech sounds, examples of which are given in Table X.

TABLE X

| Speech Sound | Language | Examples | Phonetic Transcription | Description |
|---|---|---|---|---|
| [f] | English | five | faɪv | Voiceless, labio-dental fricative |
| [v] | English | very | vɛri | Voiced, labio-dental fricative |
| [ɸ] | Japanese | Fujisan (Mt. Fuji) 富士山 | ɸuzisan or ɸudzisan | Voiceless, bilabial fricative |
| | | futuari (2 persons) 二人 | ɸutari | |
| [β] | Spanish | nuevo (new) | nwɛβo | Voiced, bilabial fricative |

Figure 21:
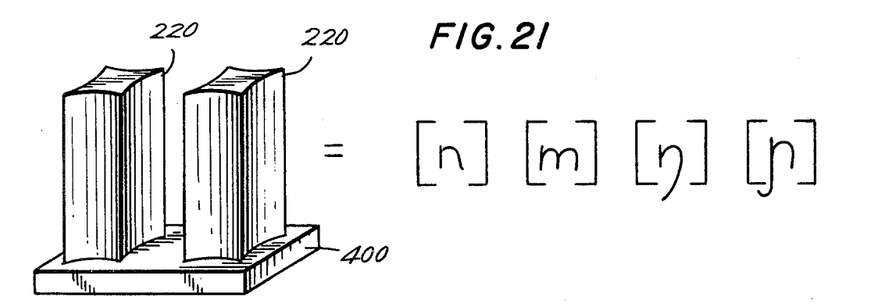

The symbol shown in FIG. 21 comprises two rectangular solids 220 of intermediate height having concave faces, to which four speech sounds have been assigned, as shown in Table XI.

TABLE XI

| Speech Sound | Language | Examples | Phonetic Transcription | Description |
|---|---|---|---|---|
| [n] | English | none | nʌn | Voiced, apico-alveolar nasal |
| [m] | English | mile | maɪl | Voiced, bilabial nasal |
| [ŋ] | English | wrong | rɔŋ | Voiced, dorso-velar nasal |
| [ɲ] | French | mignon (dainty, small, pet) | miɲɔ̃ | Voiced, palatal nasal |

Figure 22:
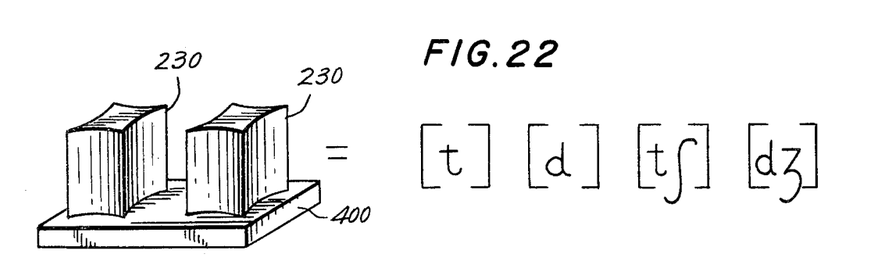

The symbol shown in FIG. 22 consists of two rectangular solids 230 of minimum height having concave faces. Examples of the four speech sounds which constitute the phonetic value of this symbol are given in Table XII.

TABLE XII

| Speech Sound | Language | Examples | Phonetic Transcription | Description |
|---|---|---|---|---|
| [t] | English | talk | tɔk | Voiceless, apical stop |
| [d] | English | done | dʌn | Voiced, apical stop |
| [tʃ] | English | church | tʃɜrtʃ | Voiceless, apical affricate |
| [dʒ] | English | judge | dʒʌdʒ | Voiced, apical affricate |

Figure 23:
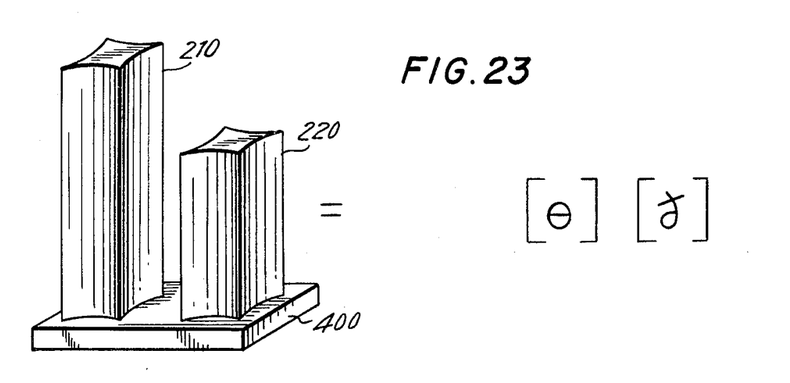

FIG. 23 shows a symbol comprised of a rectangular solid 210 of maximum height adjacent to a rectangular solid 220 of intermediate height, both of which have concave faces. Table XIII gives examples of the two speech sounds associated with this symbol.

TABLE XIII

| Speech Sound | Language | Examples | Phonetic Transcription | Description |
|---|---|---|---|---|
| [θ] | English | thin | θIn | Voiceless, apico-dental fricative |
| [ð] | English | these | ðiz | Voiced, apico-dental fricative |

Figure 24:
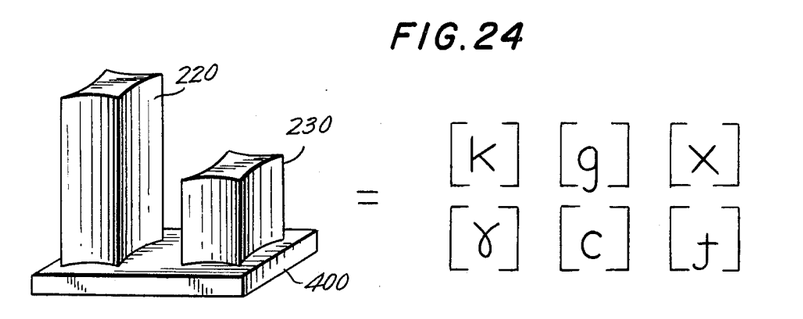

The symbol shown in FIG. 24 consists of a rectangular solid 220 of intermediate height adjacent to a rectangular solid 230 of minimum height, both of which have concave faces. Examples of the six speech sounds included in the phonetic value of this symbol are given in Table XIV.

Table XIV

| Speech Sound | Language | Examples | Phonetic Transcription | Description |
|---|---|---|---|---|
| [k] | English | kill | kIl | Voiceless, dorsal stop |
| [g] | English | guess | gɛs | Voiced, dorsal stop |
| [x] | Scottish Hebrew Spanish | loch (lake) ḥ chai (life) viaje (trip, voyage) | lɔx xaI βiaxe or biaxe | Voiceless, dorso-velar fricative |
| [ɣ] | French Spanish German | rue (street) agua (water) Göring (Göring-proper noun) | ɣy aɣwa gø:ɣIŋ | Voiced dorso-velar fricative |
| [c] | Czech | dítě (child) | ɟice | Voiceless, palatal stop (like a palatalized [k]) |
| [ɟ] | Hungarian | Magyar (Magyar-proper noun) | maɟar | Voiced, palatal stop (like a palatalized [g]) |

Figure 25:
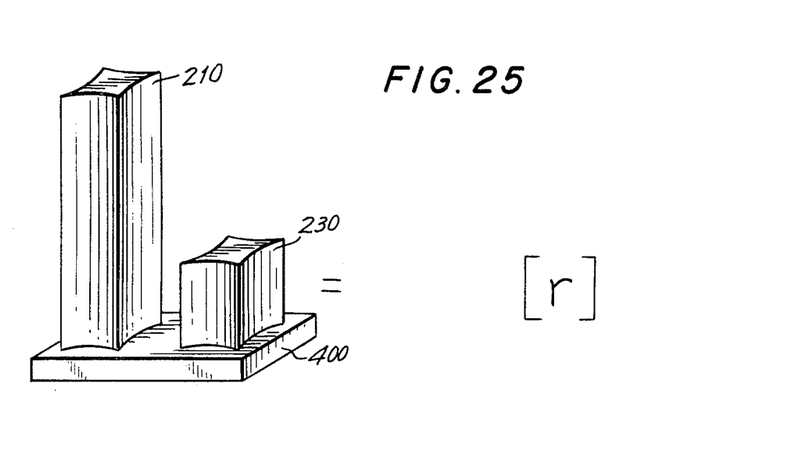

FIG. 25 shows a symbol consisting of a rectangular solid 210 of maximum height adjacent to a rectangular solid 230 of minimum height, both of which have concave faces. As shown in Table XV, only one speech sound has been assigned to this symbol, although there are many types of allophonic [r]'s in the phoneme / r /. This symbol represents the entire phoneme: the trilled, the flapped, the retroflex, etc.

TABLE XV

| Speech Sound | Language | Examples | Phonetic Transcription | Description |
|---|---|---|---|---|
| [r] | English | red | red | Voiced, apical glide |

Figure 26:
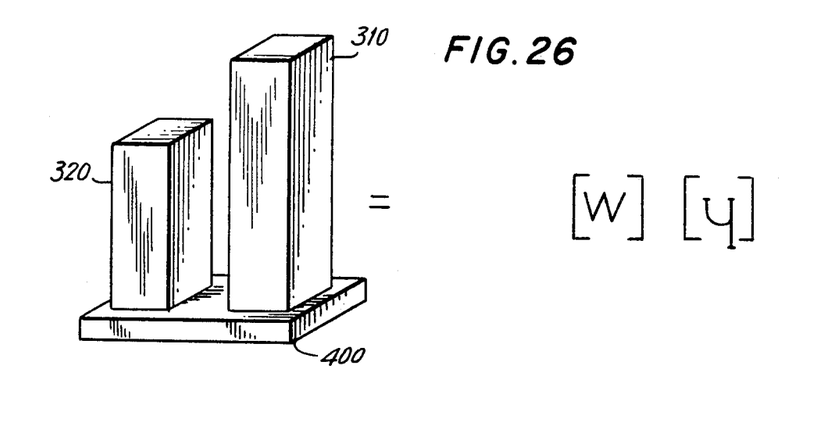

The symbol shown in FIG. 26 comprises a rectangular solid of intermediate height 320 adjacent to a rectangular solid 310 of maximum height, both of which have flat faces. Two speech sounds are associated with this symbol, examples of which are given in Table XVI.

TABLE XVI

| Speech Sound | Language | Examples | Phonetic Transcription | Description |
|---|---|---|---|---|
| [w] | English French | well allouer (to allow) | wɛl alwe | Voiced, labiovelar glide |
| [ɥ] | French | fruit (fruit, benefit) | frɥi | Voiced, labiopalatal glide |

Figure 27:
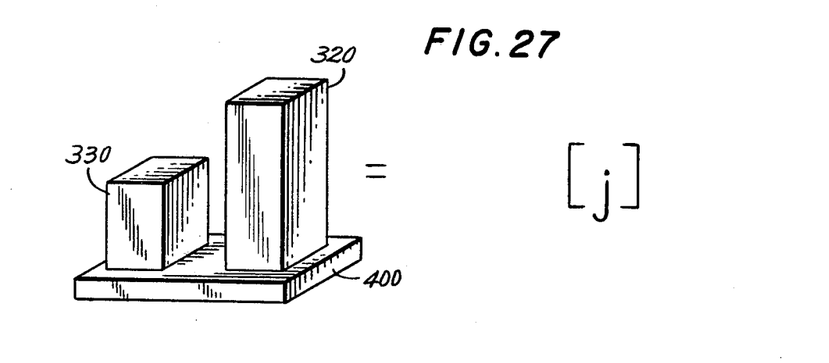

The symbol shown in FIG. 27 consists of a rectangular solid 330 of minimum height adjacent to a rectangular solid 320 of intermediate height, both of which have flat faces. The phonetic value of this symbol includes only one speech sound, as shown in Table XVII.

TABLE XVII

| Speech Sound | Language | Examples | Phonetic Transcription | Description |
|---|---|---|---|---|
| [j] | English | yes | jɛs | Voiced, (fronto-) palatal glide |

Figure 28:
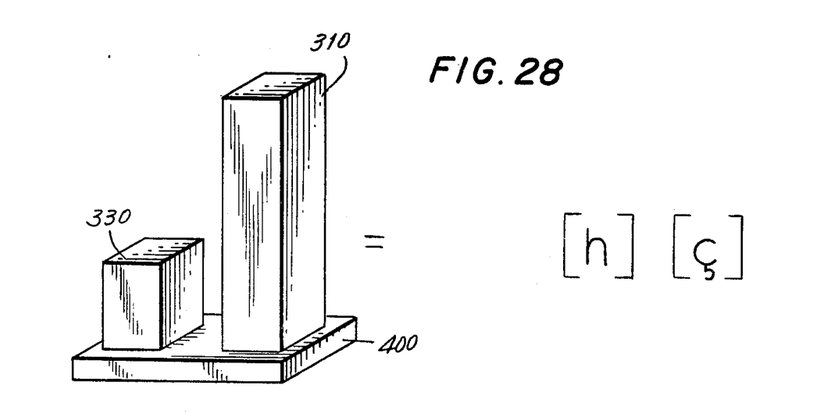

FIG. 28 shows a symbol which comprises a rectangular solid 330 of minimum height adjacent to a rectangular solid 310 of maximum height, both of which have flat faces. Examples of the two speech sounds associated with this symbol are given in Table XVIII, although as it occurs in American English, [ç] is properly an allophone of the / h / phoneme.

TABLE XVIII

| Speech Sound | Language | Examples | Phonetic Transcription | Description |
|---|---|---|---|---|
| [h] | English | hill | hIl | Voiceless aspirate, sometimes called a glottal fricative |
| [ç] | German English | ich (I) huge | Iç çjudʒ or hjudʒ | Voiceless, palatal fricative |

In the foregoing tables, the preferred phonetic value for each of the eighteen symbols of this alphabet is set forth. It will be evident, however, that the phonetic values of the symbols may be altered, if desired, and that they may be assigned to the symbols on an arbitrary basis. Nevertheless, it will be apparent to those skilled in the art that the assignment of phonetic values to these symbols ought to be determined in accordance with several considerations.

First, those speech sounds having similar characteristics or similar methods of articulation may be grouped together and assigned to one or more symbols. Thus, for example, in the preferred embodiment of the invention, all "high" vowels, i.e., those vowels which are characterized by a particular position of the tongue when they are pronounced, are assigned to cylindrical symbols of maximum height (see FIGS. 11 and 16). Similarly, "mid" vowels are assigned to cylindrical symbols of intermediate height (see FIGS. 12 and 15), and "low" vowels are assigned to cylindrical symbols of minimum height (see FIGS. 13 and 14). Diphthongization occurs throughout, but triphthongs are ignored due to their rarity.

As a further example, short sounds in which there is a small release or explosion of air (called "stops"), are grouped by subcategory and assigned to three different symbols ("bilabial" stops in FIG. 19, "apical" stops in FIG. 22, and "dorsal" stops in FIG. 24). Moreover, the phonetic values of the symbols shown in FIGS. 17, 20, 23, 24 and 28 include sounds known as "fricatives", which are grouped by subcategory, such as "sibilant" fricatives (FIG. 17) or "labial" fricatives (FIG. 20). Also, all nasal consonantal sounds are assigned to the symbol shown in FIG. 21. On the other hand, some symbols are assigned only one sound, either because the sound is unique (see FIG. 27), or because it has many uses and forms (see FIG. 25).

Another important factor which should be considered in assigning phonetic values to the symbols is the frequency of occurrence of various word combinations, of various consonant clusters, and of various vowel-consonant combinations. Thus, in the preferred embodiment, phonetic value assignments are made so that, wherever possible, the symbols composed of solids of a particular shape or height do not commonly appear beside other symbols of similar shape or height.

Accordingly, all of the vowel sounds are assigned to one of the six symbols comprised of cylindrical solids (FIGS. 11-16). Those symbols composed of rectangular solids with concave faces (FIGS. 17-25) are assigned the bulk of the frequently used consonants. Those consonants which are less frequently used are assigned to the symbols composed of rectangular solids with flat faces (FIGS. 26-28).

Other factors which should be taken into account include the need to separate minimal distinctive units, so that differentiation can occur, for example, between the words "team", "time", "tome", "tame", and "tomb". The need to minimize the number of symbols in this alphabet, both for ease of handling and in order to avoid confusion, should also be considered.

It will be evident that each of the factors mentioned hereinabove was considered in making the phonetic value assignments in the preferred embodiment of this invention.

Moreover, while the entire spectrum of human speech sound is included among the eighteen symbols of the alphabet of the present invention, permitting use by research scientists whose native languages differ, the alphabet primarily deals with basics. For example, distinctions are rarely made here between phonemes (the basic functional phonological units) and allophones (positional and articulatory variants of the same phoneme). Therefore, the term "speech sound," as used herein, refers generally to phonemes, and not to allophonic variants thereof.

For example, although the [l] in "leap" and the [l] in "pull" are both allophones of the same phoneme /l/, no distinction therebetween is made here (see FIG. 18). Similarly, the phoneme /k/ is dorsal, but has both palatal and velar allophones. As shown in FIG. 24, these minor variations in pronunciation are also ignored.

For the sake of convenience, however, the speech sounds shown in FIGS. 11-28 and in Tables I-XVIII are set forth in allophonic notation (i.e., they are enclosed within brackets), rather than phonemic notation (enclosed within slashes). Accordingly, it will be evident to those skilled in the art that the speech sounds used herein are not intended to correspond in a strict sense to accepted phonemic definitions, but are more general in application.

There are also many minor variations of sounds which have been ignored here because they are not crucial to the understanding of word meanings. Moreover, phonic elements such as stress, prosody and intonation, which serve to clarify and enhance a human language, but are certainly irrelevant to the most basic forms of communication, have not been included in this alphabet.

In the preferred embodiment of the present invention, all eighteen symbols are composed of solids made of the same plastic material and having the same density. However, because objects differing only slightly in density present different echolocation "images," dolphins, porpoises and whales are also capable of distinguishing among various objects by detecting such differences in density (see, e.g., Evans, W. E. and B. A. Powell, "Discrimination of Different Metallic Plates by an Echolocating Delphinid," *Les Systemes Sonars Animaux, Biologie et Bionique,* (R. G. Busnel, ed. September 1966), pp. 363-382), and it will be evident that the present invention may be modified so that each of the eighteen symbols has a different density, in order to further distinguish the symbols from one another. This may be done by either constructing each of the eighteen symbols out of plastic having a different density, or by constructing each of the eighteen symbols out of a different material, such as stainless steel, nickel, aluminum, brass, rubber, wood or glass, as well as plastic.

For example, the symbol shown in FIG. 11 may be constructed of plastic, while the symbol shown in FIG. 12 is constructed of glass, and the symbol shown in FIG. 13 is constructed of brass. The symbols shown in FIGS. 14-28 may each be constructed of another material, such that the density of each of the eighteen symbols differs sufficiently to provide additional echolocation "image" differentiation.

Similarly, since these creatures are capable of distinguishing colors, it may be advantageous to allow for further differentiation among the eighteen symbols by coloring each symbol differently. For example, the symbol shown in FIG. 20 may be colored red, while the symbol shown in FIG. 16 is colored blue, and the symbol of FIG. 22 is colored green. Similarly, the remaining symbols may be assigned other colors, thereby providing additional means for discrimination among the eighteen symbols by both the creatures and their human trainers.

In another alternative embodiment of this invention, differences in density or color may be used to distinguish among the several speech sounds which have been assigned to any one symbol. Thus, for example, three different versions or "sub-symbols" of the symbol shown in FIG. 11 may be constructed in order to distinguish among the three phonetic sounds assigned to that symbol, if such differentiation is found to be necessary or desirable.

Figure 29:
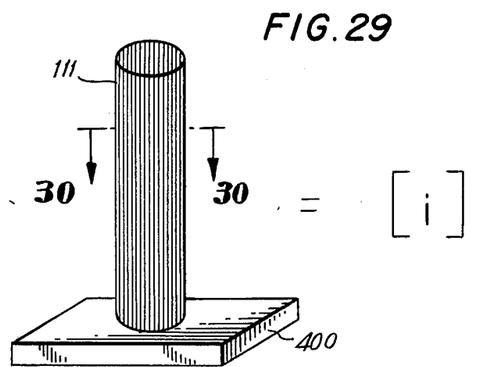
FIG. 29 is a perspective view of a sub-symbol of the symbol of FIG. 11.
Figure 30:
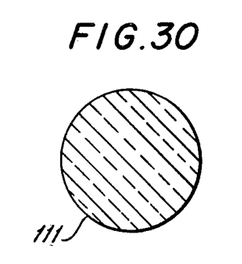
FIG. 30 is an enlarged cross-sectional view taken along the lines 30—30 of FIG. 29 in the direction of the arrows.
Figure 31:
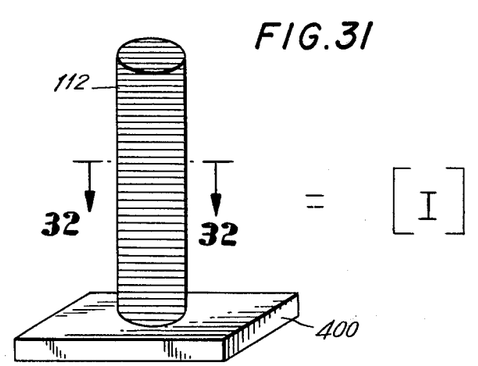
FIG. 31 is a perspective view of another sub-symbol of the symbol of FIG. 11.
Figure 32:
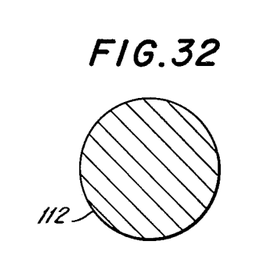
FIG. 32 is an enlarged cross-sectional view taken along the lines 32—32 of FIG. 31 in the direction of the arrows.
Figure 33:
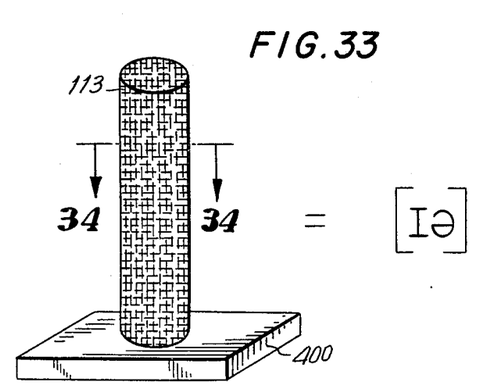
FIG. 33 is a perspective view of another sub-symbol of the symbol of FIG. 11.
Figure 34:
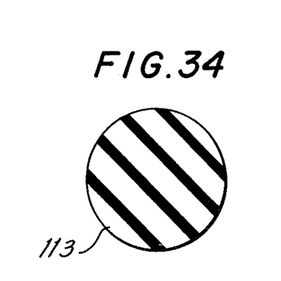
FIG. 34 is an enlarged cross-sectional view taken along the lines 34—34 of FIG. 33 in the direction of the arrows.

For example, the first sub-symbol of the symbol shown in FIG. 11 may be a cylindrical solid 111 of maximum height constructed of glass, or colored red, or both, as shown illustratively in FIGS. 29 and 30. Similarly, the second sub-symbol may be a cylindrical solid 112 of maximum height constructed of a metal, such as aluminum, or colored blue, or both, as shown illustratively in FIGS. 31 and 32, while the third sub-symbol may be a cylindrical solid 113 of maximum height constructed of rubber, or colored yellow, or both, as shown illustratively in FIGS. 33 and 34. Each sub-symbol is then assigned one of the three speech sounds which comprise the phonetic value of the symbol shown in FIG. 11 (see FIGS. 29, 31 and 33).

The other symbols having phonetic values comprised of more than one speech sound, i.e., the symbols shown in FIGS. 12–24, 26 and 28, may similarly be "divided" into sub-symbols, thereby providing an alphabet in which each speech sound is uniquely represented.

Figures 35, 36, 37:
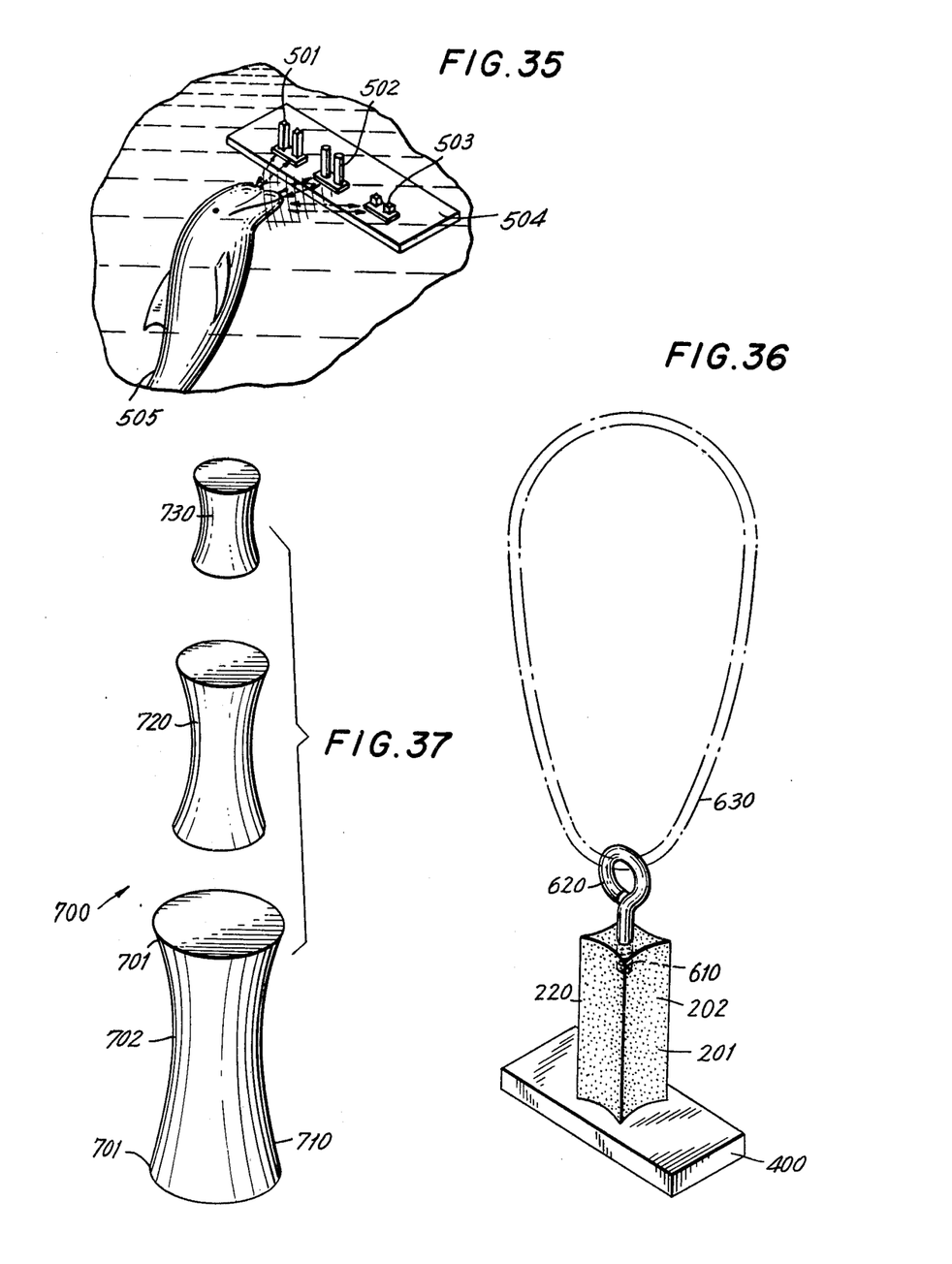
FIG. 35 shows the preferred manner of use of the present invention in conjunction with an illustrative dolphin.
FIG. 36 is a perspective view of another alternative embodiment of the present invention in which the concave faces of the rectangular solid of FIG. 2 have a rough texture, and also showing illustrative means for manipulating and rearranging the symbols comprising the present invention.
FIG. 37 is a perspective view of a hyperboloidal solid which may be utilized in an alternative embodiment of the present invention, illustrating three different sizes thereof.

As shown illustratively in FIG. 36, it is also desirable, although not essential, to add a pebble-like or roughened texture 202 to the concave faces 201 of the rectangular solid 200 of FIG. 2, which is used in the symbols shown in FIGS. 17–25. This will change the acoustical properties of rectangular solid 200 such that dolphins, porpoises and whales may more readily distinguish it aurally from the rectangular solid 300 of FIG. 3, which has flat faces 301 (see FIG. 10). While the pebble-like texture is shown illustratively in FIG. 36 in conjunction with the symbol of FIG. 18, it is to be understood that it may be used with all of the symbols shown in FIGS. 17–25.

Although in the preferred embodiment of this invention, cylindrical solids and rectangular solids having flat or concave faces are used, it will be evident that solids having other readily distinguishable shapes and different echolocation "images" may be substituted either for solid 100, solid 200, or solid 300. For example, a hyperboloidal solid, such as that shown in FIG. 37 and generally designated 700, may be used. Hyperboloidal solid 700 is a right circular solid having enlarged ends 701 and a tapered mid-section 702. The acoustical properties of hyperboloidal solid 700 are sufficiently different from those of solids 100, 200 and 300 to present a distinct echolocation "image" to the animal or animals being trained. As shown in FIG. 37, a hyperboloidal solid 710 of maximum height, a hyperboloidal solid 720 of intermediate height, and a hyperboloidal solid 730 of minimum height may be provided for use in the alphabet of the present invention. As with solids 100, 200 and 300, solid 700 may be colored and may be fashioned out of plastic, out of one of the other preferred materials, as described hereinabove, to provide variations in density.

Alternatively, although only regular geometric solids have been described herein, it will be apparent that irregular, non-geometric solids of varying size may also be used, provided that each such solid presents a distinguishable echolocation "image".

Turning now to the use and operation of the present invention, one or more of the eighteen symbols of this alphabet may be selected and arranged by a human trainer so as to form one or more words in a particular language, such as English. For example, as shown in FIG. 35, three different symbols, 501, 502, 503, forming the phonetic equivalent of the word "food" (see FIGS. 20, 16 and 22, respectively), may be placed on a shelf 504 or other supporting structure within the training tank of an illustrative dolphin 505. Since each symbol has a unique echolocation "image," the creature may then utilize its echolocation capability to recognize these symbols, as shown schematically in FIG. 35, and thereafter be taught to associate them with actual nourishment. In a similar manner, other concepts may be communicated to these creatures.

Eventually, after the creatures have mastered a small working vocabulary, they may be taught to initiate communication with their human trainers, and it will then be necessary to allow the animals themselves to select and arrange the symbols. This may be done by providing each symbol with means for selection and rearrangement. As shown in FIG. 36, the preferred means for selection and rearrangement of each symbol composed of only one solid (see FIGS. 11–13 and 17–19) includes a circular internally-threaded bore 610 at the top of the symbol into which a conventional externally-threaded eye hook 620 may be inserted. A rigid rope or chain 630 extends through eye hook 620, and is preferably large enough to permit the animal to insert its snout therein, so as to move the symbol as desired. Although in FIG. 36 the selection and rearrangement means is shown only in conjunction with solid 200, and more specifically, with the symbol of FIG. 18, it is to be understood that similar selection and rearrangement means may be used with other symbols composed of only one solid, e.g., the symbols composed of one solid 100 (shown in FIGS. 11–13). Symbols composed of one solid 300 or of one solid 700, which may be included in alternative embodiments of this invention, may similarly be provided with selection and rearrangement means, if desired.

For symbols composed of two solids (see FIGS. 14–16 and 20–28), similar attachment means may be used, although both solids may have a bore and an eye hook, or a single eye hook may alternatively be inserted in base 400.

It may be seen from the foregoing, that the embodiments described herein are by way of illustration and not of limitation, and that various changes in and other modifications of the construction, composition, and arrangement of parts are possible in light of the above teachings. Accordingly, it is to be understood that other embodiments of this invention could be utilized without departing from the spirit and scope of the present invention, as set forth in the appended claims.

We claim:

1. A set of alphabet symbols for communicating with aquatic mammals, each symbol comprising at least one three-dimensional object chosen from the group consisting of a right circular cylinder, a rectangular solid having flat faces, a rectangular solid having concave faces and a hyperboloidal solid, each object having an acoustically distinct echolocation image for detection of the objects and discrimination among the objects by said aquatic mammals, said symbols being adapted to be arranged in sequences such that said aquatic mammals can be trained to identify such sequences as symbolizing a plurality of respective concepts, each symbol also representing a human language phoentic value comprised of at least one speech sound, such that human individuals can identify such sequences as symbolizing a plurality of respective human-language words.

2. A set of alphabet symbols in accordance with claim 1 wherein the phonetic value represented by at least one symbol comprises at least one vowel sound, and wherein the phonetic value represented by at least another symbol comprises at least one consonantal sound.

3. A set of alphabet symbols in accordance with claim 2 comprising eighteen symbols.

4. A set of alphabet symbols in accordance with claim 3 wherein six symbols represent phonetic values comprising at least one vowel sound, and twelve symbols represent phonetic values comprising at least one consonantal sound.

5. A set of alphabet symbols in accordance with claim 4 wherein the objects comprising each symbol are mounted on a base.

6. A set of alphabet symbols in accordance with claim 5 wherein each symbol includes means for selection and rearrangement of said symbol.

7. A set of alphabet symbols in accordance with claim 6 wherein the concave faces of the rectangular solids having concave faces have an irregular surface texture.

8. A set of alphabet symbols in accordance with claim 7 wherein the objects comprising each symbol differ one from the other in density.

9. A set of alphabet symbols in accordance with claim 7 wherein the objects comprising each symbol are colored, and wherein the symbols differ one from the other in color.

10. A set of alphabet symbols in accordance with claim 9 wherein the objects comprising said symbols differ one from the other in density.

11. A set of alphabet symbols in accordance with claim 10 wherein a first symbol comprises a first right circular cylinder and represents a first phonetic value consisting of one speech sound of the set comprising the speech sounds [ i ], [ ɪ ] and [ ɪə ].

12. A set of alphabet symbols in accordance with claim 11 wherein a second symbol comprises a second right circular cylinder whose height is less than that of said first right circular cylinder, said second symbol representing a second phonetic value consisting of one speech sound of the set comprising the speech sounds [ e ], [ eɪ ], [ ɛə ], [ ɇ ] and [ əy ].

13. A set of alphabet symbols in accordance with claim 12 wherein a third symbol comprises a third right circular cylinder whose height is less than that of said second right circular cylinder, said third symbol representing a third phonetic value consisting of one speech sound of the set comprising the speed sounds [ aɪ ], [ ɛ ], [ ɜ ] and [ ə ].

14. A set of alphabet symbols in accordance with claim 13 wherein a fourth symbol comprises a first pair of equal-height right circular cylinders and represents a fourth phonetic value consisting of one speech sound of the set comprising the speech sounds [ æ ], [ ɛ̃ ], [ a ], [ ɑ ], [ ɑ ], [ ɒ ], [ æ̃ ], [ ɔ ], [ ɔ̃ ], [ ɔə ], [ ɔɪ ] and [ aʊ ].

15. A set of alphabet symbols in accordance with claim 14 wherein a fifth symbol comprises a second pair of equal-height right circular cylinders whose height is greater than that of said first pair of equal-height right circular cylinders, said fifth symbol representing a fifth phonetic value consisting of one speech sound of the set comprising the speech sounds [ o ] and [ oʊ ].

16. A set of alphabet symbols in accordance with claim 15 wherein a sixth symbol comprises a third pair of equal-height right circular cylinders whose height is greater than that of said second pair of equal-height right circular cylinders, said sixth symbol representing a sixth phonetic value consisting of one speech sound of the set comprising the speech sounds [ u ], [ ʊ ], [ ʊə ], [ ʌ ], [ ɪu ], [ œ ], [ æ̃ ], and [ y ].

17. A set of alphabet symbols in accordance with claim 16 wherein a seventh symbol comprises a first rectangular solid having concave faces and represents a seventh phonetic value consisting of one speech sound of the set comprising the speech sounds [ s ], [ z ], [ ʃ ] and [ ʒ ].

18. A set of alphabet symbols in accordance with claim 17 wherein an eighth symbol comprises a second rectangular solid having concave faces whose height is less than that of said first rectangular solid having concave faces, said eighth symbol representing an eighth phonetic value consisting of one speech sound of the set comprising the speech sounds [ ɪ ] and [ ʌ ].

19. A set of alphabet symbols in accordance with claim 18 wherein a ninth symbol comprises a third rectangular solid having concave faces whose height is less than that of said second rectangular solid having concave faces, said ninth symbol representing a ninth phonetic value consisting of one speech sound of the set comprising the speech sounds [ p ] and [ b ].

20. A set of alphabet symbols in accordance with claim 21 wherein a tenth symbol comprises a first pair of equal-height rectangular solids having concave faces and represents a tenth phonetic value consisting of one speech sound of the set comprising the speech sounds [ f ], [ v ], [ ɸ ] and [ β ].

21. A set of alphabet symbols in accordance with claim 20 wherein an eleventh symbol comprises a second pair of equal-height rectangular solids having concave faces whose height is less than that of said first pair of equal-height rectangular solids having concave faces, said eleventh symbol representing an eleventh phonetic value consisting of one speech sound of the set comprising the speech sounds [ n ], [ m ], [ ŋ ] and [ ɲ ].

22. A set of alphabet symbols in accordance with claim 21 wherein a twelfth symbol comprises a third pair of equal-height rectangular solids having concave faces whose height is less than that of said second pair of equal-height rectangular solids having concave faces, said twelfth symbol representing a twelfth phonetic value consisting of one speech sound of the set comprising the speech sounds [ t ], [ d ], [ tʃ ] and [ dʒ ].

23. A set of alphabet symbols in accordance with claim 22 wherein a thirteenth symbol comprises a first pair of unequal-height rectangular solids having concave faces, the first member of said first pair of unequal-height rectangular solids being taller than the second member of said first pair of unequal-height rectangular solids, said thirteenth symbol representing a thirteenth phonetic value consisting of one speech sound of the set comprising the speech sounds [ θ ] and [ ð ].

24. A set of alphabet symbols in accordance with claim 23 wherein a fourteenth symbol comprises a second pair of unequal-height rectangular solids having concave faces, the first member of said second pair of unequal-height rectangular solids having concave faces being taller than the second member of said second pair of unequal-height rectangular solids having concave faces, said first member of said second pair of unequal-height rectangular solids having concave faces being the same height as the second member of said first pair of unequal-height rectangular solids having concave faces, said fourteenth symbol representing a fourteenth phonetic value consisting of one speech sound of the set comprising the speech sounds [ k ], [ g ], [ x ], [ ɣ ], [ c ] and [ ɟ ].

25. A set of alphabet symbols in accordance with claim 24 wherein a fifteenth symbol comprises a third pair of unequal-height rectangular solids having concave faces, the first member of said third pair of unequal-height rectangular solids having concave faces being the same height as the first member of said first pair of unequal-height rectangular solids having concave faces, the second member of said third pair of unequal-height rectangular solids having concave faces being the same height as the second member of the second pair of unequal-height rectangular solids having concave faces, said fifteenth symbol representing a fifteenth phonetic value consisting of a single speech sound which includes all the allophonic variations in the phoneme [ r ].

26. A set of alphabet symbols in accordance with claim 25 wherein a sixteenth symbol comprises a first pair of unequal-height rectangular solids having flat faces, the first member of said first pair of unequal-height rectangular solids having flat faces being shorter than the second member of said first pair of unequal-height rectangular solids having flat faces, said sixteenth symbol representing a sixteenth phonetic value consisting of one speech sound of the set comprising the speech sounds [ w ] and [ ʮ ].

27. A set of alphabet symbols in accordance with claim 26 wherein a seventeenth symbol comprises a second pair of unequal-height rectangular solids having flat faces, the first member of said second pair of unequal-height rectangular solids having flat faces being shorter than the second member of said second pair of unequal-height rectangular solids having flat faces, said second member of said second pair of unequal-height rectangular solids having flat faces being the same height as the first member of said first pair of unequal-height rectangular solids having flat faces, said seventeenth symbol representing a seventeenth phonetic value consisting of the speech sound [ j ].

28. A set of alphabet symbols in accordance with claim 27 wherein an eighteenth symbol comprises a third pair of unequal-height rectangular solids having flat faces, the first member of said third pair of unequal-height rectangular solids having flat faces being the same height as the first member of said second pair of unequal-height rectangular solids having flat faces, the second member of said third pair of unequal-height rectangular solids having flat faces being the same height as the second member of said first pair of unequal-height rectangular solids having flat faces, said eighteenth symbol representing an eighteenth phonetic value consisting of one speech sound of the set comprising the speech sounds [ h ] and [ ç ].

29. A set of alphabet symbols in accordance with claim 28 further comprising for each symbol representing a phonetic value comprised of more than one speech sound a plurality of colored sub-symbols, each colored sub-symbol representing one of said speech sounds and having an echolocation image identical to the echolocation image of a respective symbol, the objects comprising said sub-symbols differing one from the other in color for discrimination among the sub-symbols by said aquatic mammals.

30. A set of alphabet symbols in accordance with claim 28 further comprising for each symbol representing a phonetic value comprised of more than one speech sound a plurality of sub-symbols, each sub-symbol representing one of said speech sounds, the objects comprising said sub-symbols differing one from the other in density for discrimination among the sub-symbols by said aquatic mammals.

31. A set of alphabet symbols in accordance with claim 29 wherein for each said symbol representing a phonetic value comprised of more than one speech sound, the objects comprising said colored sub-symbols differ one from the other in density for further discrimination among the sub-symbols by said aquatic mammals.

* * * * *